(12) United States Patent
Lawler

(10) Patent No.: US 7,761,286 B1
(45) Date of Patent: Jul. 20, 2010

(54) NATURAL LANGUAGE DATABASE SEARCHING USING MORPHOLOGICAL QUERY TERM EXPANSION

(75) Inventor: Nancy Kathleen Lawler, Baltimore, MD (US)

(73) Assignee: The United States of America as represented by the Director, National Security Agency, Washington, DC (US)

( * ) Notice: Subject to any disclaimer, the term of this patent is extended or adjusted under 35 U.S.C. 154(b) by 1408 days.

(21) Appl. No.: 11/122,206

(22) Filed: Apr. 29, 2005

(51) Int. Cl.
G06F 17/20 (2006.01)
G06F 17/30 (2006.01)
(52) U.S. Cl. .......................... 704/1; 707/765
(58) Field of Classification Search ................ None
See application file for complete search history.

(56) References Cited

U.S. PATENT DOCUMENTS

| | | | | |
|---|---|---|---|---|
| 4,342,085 A | * | 7/1982 | Glickman et al. | 715/234 |
| 5,229,936 A | * | 7/1993 | Decker et al. | 704/10 |
| 5,418,948 A | * | 5/1995 | Turtle | 707/4 |
| 5,559,693 A | * | 9/1996 | Anick et al. | 704/9 |
| 6,018,708 A | | 1/2000 | Dahan et al. | |
| 6,101,492 A | * | 8/2000 | Jacquemin et al. | 707/3 |
| 6,182,039 B1 | | 1/2001 | Rigazio et al. | |
| 6,338,057 B1 | * | 1/2002 | Weeks | 707/3 |
| 6,557,004 B1 | | 4/2003 | Ben-Shachar et al. | |
| 6,662,180 B1 | | 12/2003 | Aref et al. | |
| 6,785,677 B1 | * | 8/2004 | Fritchman | 707/6 |
| 7,171,351 B2 | * | 1/2007 | Zhou | 704/9 |

* cited by examiner

*Primary Examiner*—Talivaldis Ivars Smits
*Assistant Examiner*—Jesse S Pullias
(74) *Attorney, Agent, or Firm*—Jennifer P. Ferragut; Robert D. Morelli

(57) ABSTRACT

The present invention is a method of database searching. First, a language is selected. Next, elements are received. The system is then searched to identify at least one unit number that is associated with a chosen element, the unit number being linked to a data unit containing morphological variants of the element. If no unit number is identified, the element is compared to a prefix list. If no match is found there, the element is broken into a prefix and suffix, and the prefix and suffix are matched to a prefix list, suffix list or a unit number. This process is repeated for all elements. A unit number associated with each element is then chosen, and the elements contained in the data units linked to the unit numbers are compared to a database. The results are displayed and preferably ranked according to user preferences. If an element is associated with multiple unit numbers, this process is repeated until all data units have been compared to the database.

12 Claims, 2 Drawing Sheets

NATURAL LANGUAGE DATABASE SEARCHING USING MORPHOLOGICAL QUERY TERM EXPANSION

FIELD OF THE INVENTION

This invention relates to linguistics and, more specifically, to natural language processing.

BACKGROUND OF THE INVENTION

In the field of text processing and database searches, an increasing problem has become the need to cross reference indexes using combined phrases. Among other uses, there has been a marked increase in demand for combined phrase cross-referencing engines in name searching tools. Name searching tools exist in several different contexts. For example, several hand held and cellular devices contain address books, and a combined phrase cross-referencing engine is necessary to conveniently search these address books. Similarly, through the advancement of voice recognition technology several companies offer online directories of topics and personnel. Databases such as those of telephone subscribers and hospital patients often require that a human or automated search for names be conducted without complete and accurate specification of spelling and parts. Because the spoken words are not always clear, the most likely possible words are taken from the sounds recognized by the system, and these words are cross-referenced against the company directories.

An effective cross-referencing engine will allow rapid comparison of the combined phrase or phrases to the referenced database. Users are generally unwilling to wait long periods of time to find matches for their queries, and in an environment where a live assistant is available (such as an operator or receptionist when using a voice recognition directory), the user may switch to the live assistant option to avoid the wait time. This would increase expenses to the company by increasing the staffing necessary to respond to the user. With other devices, convenience is a driving factor when a user is choosing a device to purchase. The speed with which a device can process a query may cause a user to purchase one device over another. Therefore, efficiency of the cross-referencing engine is critical in all the devices discussed above.

The other major concern for users in regard to cross-referencing engines is accuracy. When comparing a combined term to a list of single or combined terms, the user wants only the relevant results. However, the user also wants to ensure that no results are omitted. This delicate balance is extremely difficult to achieve. This is especially true with name searches. For such services, if a match is not exact, it is preferable that the differences and similarities be knowledge based ("mohd" is a conventional abbreviation for "Mohamed") rather than "fuzzy" ("Hasan" and "Wasan" differ by one letter.) Frequently, when a name search is performed only a partial name is known. That may be, for example, the first letter of the first name and the entire last name. In this case, the user would want all possible names located. Another common problem is that names are commonly misspelled. For example, the name Thompson is also spelled Thomsen, Thomson, Tomson, Tomsen, and using several other variant spellings. A user may, in some cases, want to find all the variants of this name in case of a misspelling when searching a directory. This is common in company directories and other voice recognition directory systems. Performing an accurate search of a combined term generally consists of a complex series of iterations and lexicographic algorithms. These steps can significantly slow operation of the cross-referencing engine. Therefore, a system is needed in the art that efficiently cross-references a search term and all related variants against a database.

U.S. Pat. No. 6,018,708, entitled "METHOD AND APPARATUS FOR PERFORMING SPEECH RECOGNITION UTILIZING SUPPLEMENTAL LEXICON OF FREQUENTLY USED ORTHOGRAPHIES," discloses a system for obtaining the most likely matches for input speech and introducing additional matches to the list based on prior usage of the system by the speaker. To obtain the most likely matches, multiple comparisons of the spoken word are made to a rated dictionary, and words from the dictionary are eliminated with each comparison according to the ranking of the words as a match to the input word. The additional match added to the list is a word that is introduced based on the frequency that the word was previously selected by the system based on input by the same speaker. The present invention does not use the method of this system. U.S. Pat. No. 6,018,708 is hereby incorporated by reference into the specification of the present invention.

U.S. Pat. No. 6,182,039, entitled "METHOD AND APPARATUS USING PROBABLISTIC LANGUAGE MODEL BASED ON CONFUSABLE SETS FOR SPEECH RECOGNITION," discloses a speech recognizer that generates a list of possible names from input speech by considering a group of acoustic pattern matching sequences. Essentially, because certain letters may be confused with other letters when heard by a speech recognizer (such as "f" and "s"), the speech recognizer considers all possible matches for the input speech. The list is generally compiled using a tree structure, N-gram structure or interactively configured on a network having nodes. The present invention does not operate using the same principles of this system. U.S. Pat. No. 6,182,039 is hereby incorporated by reference into the specification of the present invention.

U.S. Pat. No. 6,557,004, entitled "METHOD AND APPARATUS FOR FAST SEARCHING AND HAND-HELD CONTACTS LIST," discloses a method for searching a database in a hand held device for contacts that match an input data string. The device first searches for first names that match the first name of the data string. The device next searches a "filed as" field that contains first names and last names, company names, and any other user-definable name choice for matches for the data string. The results for the two searches are combined to generate the final result. The present invention does not use this method to perform data matching. U.S. Pat. No. 6,557,004 is hereby incorporated by reference into the specification of the present invention.

U.S. Pat. No. 6,662,180, entitled "METHOD FOR SEARCHING IN LARGE DATABASES OF AUTOMATICALLY RECOGNIZED TEXT," discloses a method for determining possible matches for input words in databases. This method is particularly well suited for optical character recognition and speech recognition, where the input words often are not immediately identifiable. With this method, the database is indexed by a trie data structure having a branch node and a number of leaf nodes, the combination of branch and leaf nodes representing a word. The first letter of the input word is identified, and this letter is use to search the database. The probabilities of the words of the trie structure are calculated based on the input word and the letters found in the particular trie structure. These probabilities are used to generate the results list, which includes the best matches. The present invention does not use this method to find matches for input data. U.S. Pat. No. 6,662,180 is hereby incorporated by reference into the specification of the present invention.

The difficulty in performing a database search when there is a query string that has a large number of possible alternatives (whether due to misspellings, variant transliterations or abbreviations, or erroneous system recognition such as in speech recognition) lies in determining all possible alternatives and comparing these against the database in an efficient manner. If less than all the alternatives are found, it is possible the desired result will be omitted. If the system performs an inefficient comparison, the system will take an inordinately long time to return results to the user. This problem is particularly complicated when the input is a data string containing multiple terms. It is therefore desirable in the art to have a database search system that is capable of efficiently searching multiple input terms, each term having multiple alternative spellings.

SUMMARY OF THE INVENTION

It is an object of the present invention to provide a database searching method that provides all possible matches for a search string the elements of which may have multiple morphologies.

It is a further object of the present invention to provide a database searching method that provides all possible matches for each element of the search string having multiple possible morphologies, wherein the database search matches all possible morphologies for the search string. The method depends on an independent knowledge base which must associate a unique identifier with a set of valid or allowed variants. It also depends on a set of composition and morphological rules for identifying independently varying parts, typically prefixes and suffixes for natural language identifiers.

It is yet another object of the present invention to provide a database searching method that returns all possible matches for a search string having multiple possible morphologies, wherein the database search accounts for all possible morphologies for the search string and the possible matches are ranked according to the probability of the match being the preferred match for the search string.

The present invention is a method of database searching. The first step of the method is identification of a language for a search string.

The second step of the method is receiving a search string containing at least one primary element, where each primary element includes at least one sub-textual unit.

The third step of the method is selecting one primary element.

The fourth step of the method is attempting to identify at least one unit number associated with a data unit, wherein the data unit includes a plurality of secondary elements.

The fifth step of the method is if no data unit is identified in the fourth step, comparing the primary element to a prefix list.

The sixth step of the method is if no match is made in the fourth or fifth steps then (i) setting n equal to the total number of sub-textual units in the selected element and setting s equal to n, (ii) setting a test-suffix equal to the rightmost s sub-textual units in the selected element and setting prefix equal to n−s leftmost sub-textual units in the selected element, (iii) comparing the prefix to the prefix list, (iv) comparing the test-suffix to a suffix list and to the secondary elements (v) if no match is made in step (iii) or (iv) then setting s equal to s−1 and returning to step (ii), and (vi) identifying at least one unit number associated with a data unit having an identifier matching the test-suffix of the primary element, wherein the data unit includes a plurality of secondary elements.

The seventh step of the method is selecting an unprocessed primary element and returning to the fourth step if there are any unprocessed primary elements.

The eighth step is selecting a primary element.

The ninth step is selecting a unit number identified with the primary element.

The tenth step is selecting a primary element not previously selected and returning to the eighth step if there are any primary elements not selected.

The eleventh step is comparing the data units associated with each of the unit numbers selected in the ninth step with a database index containing strings normalized by the same system into a sequence of unit numbers.

The twelfth step is outputting the results of the eleventh step.

The thirteenth step is if any primary element has a plurality of unit numbers identified with it proceeding to the fourteenth step, otherwise stopping.

The fourteenth step is selecting a unit number not previously selected for each primary element having a plurality of unit numbers identified with it, and having at least one unit number not previously selected, otherwise selecting a unit number identified with each other element.

The fifteenth step is comparing the data units associated with each of the unit numbers selected in the fourteenth step with the similarly normalized index, as in the eleventh step, for a database.

The sixteenth step is outputting the results of the sixteenth step.

The seventeenth step is returning to the fourteenth step if any primary element has a unit number identified with it that has not been selected, otherwise stopping.

DETAILED DESCRIPTION OF THE PREFERRED EMBODIMENT

Figure 1:
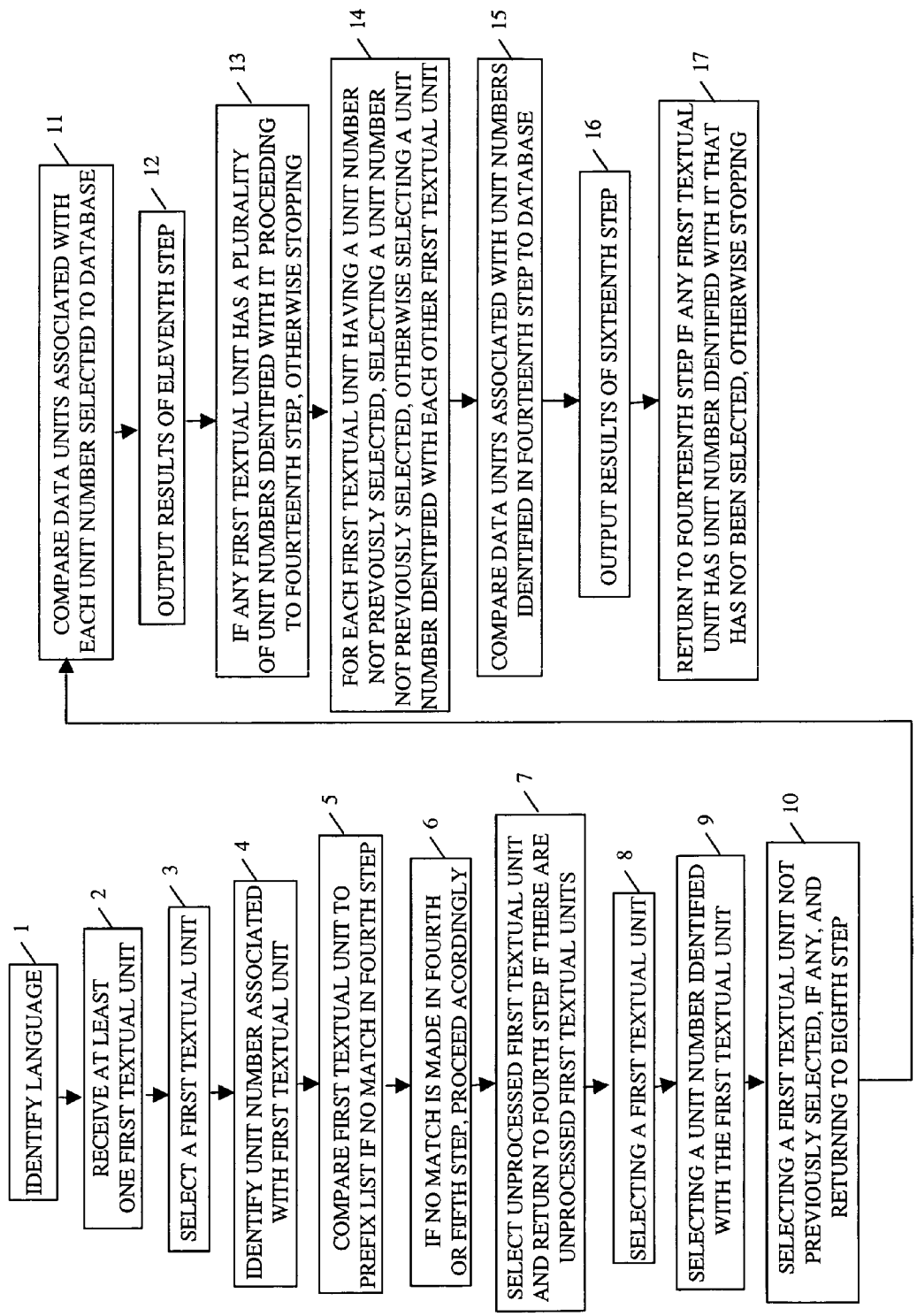
FIG. 1 is a flowchart of the steps of the present invention.

The present invention is a method of database searching. FIG. 1 is a list of the steps of the method of the present invention. The first step 1 of the method is selecting a language. The language selected should be the language of the data to be analyzed by the system. Any language can be analyzed using the method of the present invention as would be obvious to one of skill in the art, such as English, French, Albanian, Basque, Greek, Turkish, Hindi or Japanese. A string may be multi-lingual or multi-cultural.

The second step 2 of the method is receiving at least one primary element, where each primary element includes at least one sub-textual unit. An element is any distinct, independent string of letters or symbols that comprise a word. For example, an element may be an English word composed of multiple letters from the Latin alphabet, a Chinese symbol representing a word, or a Japanese word comprised of Kanji symbols. An element may also be an alphanumeric identifier, such as a telephone number or e-mail address. Many other elements are possible and will vary depending on the language, as would be obvious to one of skill in the art. In the preferred embodiment, the elements represent portions of names, such as a first, middle or last name.

A sub-textual unit is a subset of a word within a single element, typically a character or portion of a symbol. Different languages use different methods for representing words. For example, English uses combinations of letters from the Latin alphabet to represent words, each letter comprising a sub-textual unit. Japanese uses Kanji symbols, each Kanji symbol typically comprising a single sub-textual unit. As is obvious to one of skill in the art, the specific characters or symbols that comprise a sub-textual unit will depend on the language at issue.

The third step 3 of the method is selecting one primary element. As was discussed in detail previously, a single element represents a single word or name element. A user-definable element may be selected, however in the preferred embodiment the primary element in the string of elements is selected. A textual-unit can be selected using any conventional method, many of which are well known and commonly used in the art, such as choosing whether order is preserved or whether elements may be missing by selecting appropriate options on a computer display.

The fourth step 4 of the method is identifying at least one unit number associated with a data unit having an identifier matching the primary element, wherein the data unit includes a plurality of secondary elements. A data unit is a group of associated elements, the elements being associated because of morphological characteristics. In the preferred embodiment, a data unit contains all possible morphologies of a given element. In an alternative embodiment, morphologies for a given element may be split among multiple data units. All these possible morphologies comprise the secondary element. Each data unit has a unit number. A unit number is a unique identifier for a data unit. Matching a single secondary element in a data unit allows all the secondary elements in the data unit to be obtained. Unit numbers are essential to differentiate these data units, especially when data units contain secondary elements having similar morphologies. Unit numbers are, therefore, preferably associated with each data unit.

The fifth step 5 of the method is comparing the primary element to a prefix list if no data unit is identified in the fourth step 4 of the method. The prefix list is preferably a list of known prefixes. For example, "van" is a prefix that frequently stands alone as a element in names in the Dutch language, but may be combined with a name. If the language selected was Dutch, and a name search were being performed, "van" may appear in a prefix list. Other prefixes would be language dependant and based on user preferences, as would be obvious to one of skill in the art.

The sixth step 6 of the method is if no match is made in the fourth step 4 or fifth step 5, then (i) setting n equal to the total number of sub-textual units in the selected textual unit and setting s equal to n, (ii) setting a test-suffix equal to the rightmost s sub-textual units in the selected element and setting prefix equal to n–s leftmost sub-textual units in the selected element, (iii) comparing the prefix to the prefix list and to the data units, (iv) comparing the test-suffix to a suffix list and to the data units, (v) if no match is made in step (iii) and (iv) then setting s equal to s–1 and returning to step (ii), and (vi) identifying at least one unit number associated with a data unit having an identifier matching the test-suffix or prefix of the primary element, wherein each data unit includes a plurality of secondary elements.

If a match is not made to either the prefix list or a the data unit, the element must be further broken down to find a match to a data unit. This is done using the series of steps described above, which will be discussed in greater detail with reference to FIG. 2.

Figure 2:
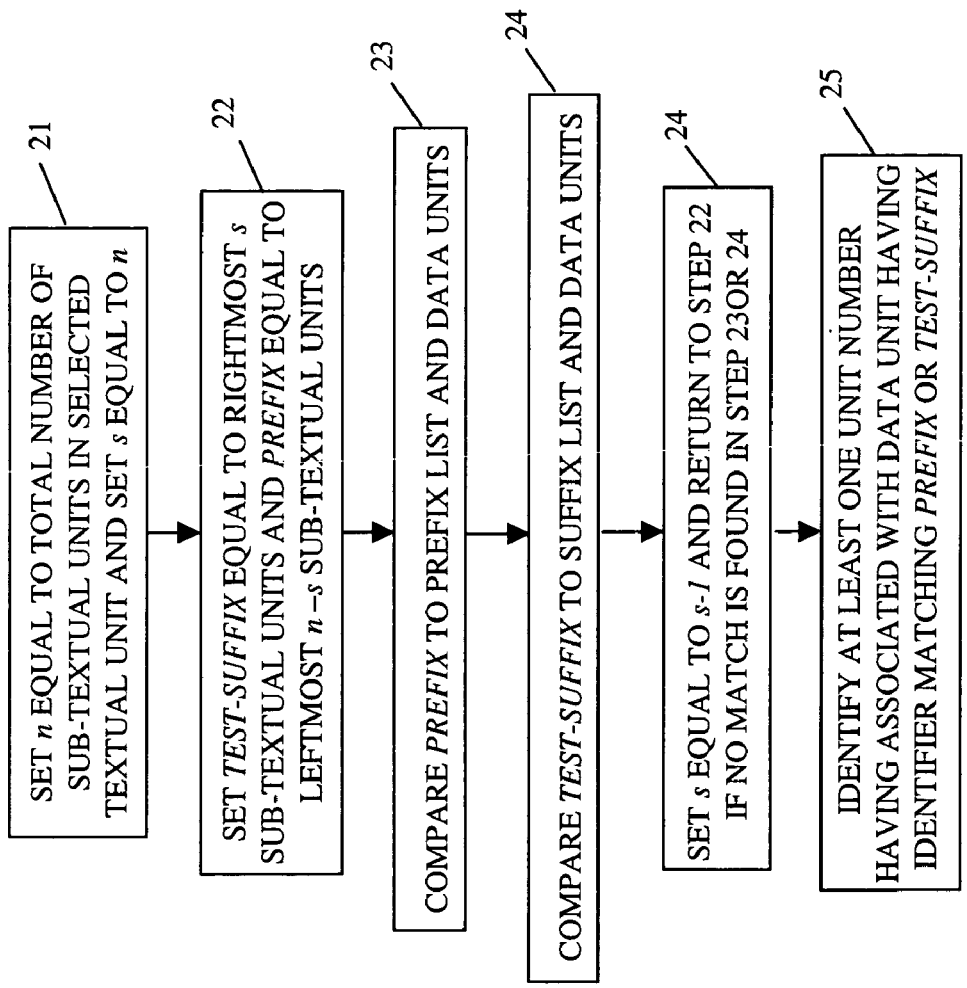
FIG. 2 is a flowchart detailing the steps of the sixth step of the method in FIG. 1.

FIG. 2 is a list of steps to analyze an element according to the sixth step 6 of the method listed in FIG. 1. The first step 21 in FIG. 2 according to this method is setting n equal to the total number of sub-textual units in the selected primary element and setting equal to n. As was discussed in detail above, a sub-textual unit is a single character or symbol of a element. The variable n is defined as the number of sub-textual units in the selected element. The variable s is set to equal n.

The second step 22 is setting a test-suffix equal to the rightmost s sub-textual units in said selected element and setting prefix equal to n–s leftmost sub-textual units in said selected element. As is obvious with reference to the sixth step 6 of the method, because n is initially set to equal s, the test suffix will initially comprise the entire element and the prefix will entirely comprise no sub-textual units.

The third step 23 is comparing the prefix to the prefix list and to the data units. As was discussed in greater detail above, the prefix list includes a list of common prefixes for the language selected in the first step 1 of the method of FIG. 1. Each data unit contains a number of secondary elements. In the third step 23 of FIG. 2, the prefix is compared to the prefix list and the data units to determine if any prefix on the prefix list or any secondary elements in the data units match prefix.

The fourth step 24 of the method is comparing the test-suffix to a suffix list and to the data units. The suffix list is similar to the prefix list, but contains common suffixes for a given language. As with the prefix list, the list of suffixes will be language dependent, as would be obvious to those of skill in the art. The test-suffix is also compared to the data units. In the fourth step 24 of FIG. 2, the test-suffix is compared to the suffix list and the data units to determine if any suffix on the suffix list or any secondary elements in the data units match prefix.

The fifth step 25 is setting s equal to s–1 and returning to the second step 22 of the method if no match is made in the third step 23 or the fourth step 24 of the method. If the prefix and the test-suffix initially derived in the second step 22 of the method does not allow a match to be located in the third step 23 or fourth step 24 of the method, a new rightmost string must be derived. This is accomplished by shortening s by 1, returning to the second step 22 of the method, and re-defining the prefix. Alternative methods of moving along the string can be used, such as starting with the longest prefix and obtaining a progressively shorter one, as would be obvious to those of skill in the art. Any conventional method may be used in combination with this invention.

The sixth step 26 of the method is identifying at least one unit number associated with a data unit matching the test-suffix or prefix of the primary element, wherein the data unit includes a plurality of secondary elements. Essentially, by identifying any prefix or suffix and isolating the test-suffix or prefix, the method of FIG. 2 has performed the same function of the fifth step 5 of the method of FIG. 1. That is, in the method of FIG. 2, a prefix or suffix was eliminated allowing the appropriate element to be identified, leading to identification of the correct morphologies and unit number to be identified with the selected primary element. This becomes clear with names like "MacDonald." In some cases, the "Mac" stands alone. In others, the "Mac" is combined with the "Donald," requiring the method of FIG. 2 for the proper association of the selected primary element with appropriate data units.

The seventh step 7 of the method of FIG. 1 is selecting an unprocessed primary element and returning to the fourth step 4 if there are any unprocessed primary elements. If multiple elements were received in the second step 2, in the preferred embodiment the next unprocessed element in the string of elements is selected in the seventh step 7. However, any primary element in the string of primary elements may be selected according to user preferences.

The eighth step 8 of the method is selecting a primary element. As was discussed with reference to the second step 2, a user-definable primary element may be selected, however in the preferred embodiment the primary element in the string of elements is selected. A textual-unit can be selected using any conventional method, many of which are well known and commonly used in the art, such as selecting the desired element with a keyboard.

The ninth step 9 of the method is selecting a unit number identified with the primary element. As was discussed in greater detail above with reference to the fourth step 4 and sixth step 6 of the method, unit numbers are associated with each primary element. These unit numbers identify data units containing multiple alternative morphologies of the selected primary element. As was also discussed in greater detail above, a single primary element may be identified with more than one unit number, in which case the first ordered unit number is preferably selected in the ninth step 9 of the method.

The tenth step 10 of the method is selecting a primary element not previously selected and returning to the eighth step 8 if there are any primary elements not selected. As was discussed in greater detail above, in the preferred embodiment, if multiple elements were received in the second step 2, in the preferred embodiment the next element in the string of elements that was not previously selected is selected in the tenth step 10. However, any primary element in the string of primary elements may be selected according to user preferences.

The eleventh step 11 of the method is comparing data units associated with each of the unit numbers selected in the ninth step 9 with a similarly normalized database index. The database index contains a number of normalized identifiers, each identifier being linked to information in a database that is of interest to the user. In the preferred embodiment, each identifier in the database (derived from the identifiers occurring in the data) consists of a series of unit numbers produced by the same algorithm used for the query string. The identifiers are compared to the unit numbers of each data unit to find matches. This enables a very fast and flexible comparison of query string and indes. The degree of tolerance for a match is user-definable, therefore if a search string contains three elements and results in a search having three unit numbers, the user may require an exact match, a three number match, or a single number match.

The information in the database that is linked to the database index may take the form of a contact list, telephone directory, text document, or other compilation of data according to user preferences. As would be obvious to one of skill in the art, the database contains a plurality of elements, these elements preferably being grouped, such as into name units or similar groupings allowing them to be compared to search strings of similar type input by the user. As is further obvious to those of skill in the art, there are several methods of grouping elements in databases, such as inserting grouped elements in a single field in a database having multiple fields. In a preferred embodiment multiple databases exist, and the user selects one or more databases for comparison to query strings.

As was discussed in greater detail above, each unit number is associated with a data unit, and each data unit includes a plurality of secondary elements. Using methods obvious to the skill of the art, the combinations of unit numbers are matched to precomputed groupings of identifiers for phrases in the database as was explained in greater detail above. In an alternative embodiment, wildcard terms, such as previously omitted prefixes, may be included with the data units to perform a more thorough search. Methods of including additional terms in a database search are well known to those skilled in the art, and any conventional method can be used in conjunction with this invention. This comparison is performed for the data units associated with each primary element selected in the ninth step 9, thus if a search term contains multiple elements the search of the database will return results matching all or some of the elements. In a preferred embodiment the results are ranked based on the number of terms matched. The results may be further ranked according to probabilities associated with each secondary element. For example, if a secondary element is particularly likely to appear this information will be stored along with the secondary element in each data unit. When this secondary element is matched in a database a result containing this secondary element will be ranked lower than a result containing a secondary element that occurs less often.

The twelfth step 12 of the method is outputting the results of the eleventh step 11. As was discussed in greater detail above, the comparison of the data units to the database results in matches of the secondary elements to elements in the database. In the preferred embodiment, these results are ranked by the number of primary elements in the input string matched and the probability associated with the secondary elements. The results output by the system are in the form of the information linked to the identifiers in the database index, and therefore generally take the form of a natural name, alphanumeric sequence, or other normalized form of a string of elements. These matches are output using any conventional means, such as outputting the data to a computer monitor in HTML format.

The thirteenth step 13 of the method is if any primary element has a plurality of unit numbers identified with it proceeding to the fourteenth step 14, otherwise stopping. As was discussed in greater detail above, a primary element may be associated with multiple unit numbers and, consequently, multiple data units. If this is the case, the method proceeds to the fourteenth step 14. Otherwise, the method is stopped.

The fourteenth step 14 of the method is selecting a unit number not previously selected for each primary element having a plurality of unit numbers identified with it, and having at least one unit number not previously selected, otherwise selecting a unit number identified with each other element. As was discussed in greater detail above, a primary element may be identified with more than one unit number, and therefore more than one data unit. To ensure all possible morphologies are considered when searching a database, all data units associated with a primary element must be compared to the database index. Therefore, if any data units remain that are associated with a primary element that have not been compared to a database index, the unit numbers for these data units are selected to provide a thorough comparison between the primary elements and the database. If all unit numbers have already been selected for a primary element, any unit number can be selected for that element, as all unit numbers have a thorough analysis already performed for all data units associated with that primary element. In an alternative embodiment, that element can be omitted. In a further alternative embodiment, wildcard characters can be entered, for example, wildcards representing prefixes, to perform a more permissive search.

The fifteenth step 15 of the method is comparing the data units associated with each of the unit numbers selected in the fourteenth step 14 with the database index. The comparison performed in the fifteenth step 15 of the method is essentially the same as the comparison performed in the eleventh step 11 of the method, and therefore will not be discussed in detail. To summarize, the elements contained in all data units associated with the unit numbers selected in the fourteenth step 14 of the method are compared to the database index to find matches. These matches can be ranked according to user preferences.

The sixteenth step 16 of the method is outputting the results of the fifteenth step 15 of the method. As was discussed in greater detail above, the results are the results of the comparison of the data units to the database index associated with each database. The associated information for match by the comparison performed in the fifteenth step 15 of the method is preferably output by the system in the sixteenth step 16 of the method. In the preferred embodiment, these results are ranked by the number of primary elements in the input string matched and the probability associated with the secondary elements or the combined data units. These matches are output using any conventional means, such as outputting the data to a computer monitor in HTML format.

The seventeenth step 17 is returning to the fourteenth step 14 if any primary element has a unit number identified with it that has not been selected, otherwise stopping. As was discussed in greater detail above, to perform a thorough search all data units associated with a primary element must be compared to the database. To accomplish this, all unit numbers identified with each primary element must be selected and the associated data units must be compared to the database according to the method of the present invention. If any unit numbers remain that have not been selected, the method returns to the fourteenth step 14 for further processing of the primary elements. Otherwise the method stops.

What is claimed is:

1. A method of text processing, comprising the steps of:
   a) selecting a language;
   b) receiving at least one primary element, where each primary element includes at least one sub-textual unit;
   c) selecting one primary element on a computing device;
   d) identifying at least one unit number associated with a data unit having a secondary element matching the primary element, wherein the data unit includes a plurality of secondary elements;
   e) if no data unit is identified in step (d), comparing the primary element to a prefix list;
   f) if no match is made in steps (d) or (e), then:
      i) setting n equal to the total number of sub-textual units in the selected element and setting s equal to n;
      ii) setting a test-suffix equal to the rightmost s sub-textual units in the selected element and setting prefix equal to n−s leftmost sub-textual units in the selected element;
      iii) comparing the prefix to the prefix list and a plurality of data units, wherein each data unit includes a plurality of secondary elements;
      iv) comparing the test-suffix to a suffix list and to the data units;
      v) if no match is made in step (iii) or (iv) then setting s equal to s−1 and returning to step (ii); and
      vi) identifying at least one unit number associated with a data unit having a secondary element matching the prefix or test-suffix of the primary element, wherein the data unit includes a plurality of secondary elements;
   g) if there are any unprocessed primary elements, selecting an unprocessed primary element and returning to step (d);
   h) selecting a primary element;
   i) selecting a unit number identified with the primary element;
   j) if there are any primary elements not selected, selecting a primary element not previously selected and returning to step (h);
   k) comparing the data units associated with each of the unit numbers selected in step (i) with at least one database index of a database;
   l) outputting the results of step (k);
   m) if any primary element has a plurality of unit numbers identified with it proceeding to step (n), otherwise stopping;
   n) for each primary element having a plurality of unit numbers identified with it, and having at least one unit number not previously selected, selecting a unit number not previously selected, otherwise selecting a unit number identified with each other element;
   o) comparing the data units associated with each of the unit numbers selected in step (n) with at least one database index;
   p) outputting the results of step (o); and
   q) if any primary element has a unit number identified with it that has not been selected, returning to step (n), otherwise stopping.

2. The method of claim 1, further including the step of ranking the result of step (k).

3. The method of claim 2, further including the step of ranking the result of step (o).

4. The method of claim 3, wherein each sub-textual unit is selected from the group of sub-textual units comprising letters, symbols, and any other suitable sub-textual unit.

5. The method of claim 4, wherein the step of comparing the data units associated with each of the unit numbers selected in step (i) with at least one database index comprises comparing the data units associated with each of the unit numbers selected in step (i) and at least one wild card with at least one database index.

6. The method of claim 5, wherein each wildcard is selected from the group of wildcards representing prefixes, elements, sub-textual units, any combination thereof and any other suitable wildcards.

7. The method of claim 6, wherein each element is selected from the group of elements comprising a name, word, character, symbol, and any other suitable element.

8. The method of claim 1, further including the step of ranking the result of step (o).

9. The method of claim 1, wherein each sub-textual unit is selected from the group of sub-textual units comprising letters, symbols, and any other suitable sub-textual unit.

10. The method of claim 1, wherein the step of comparing the data units associated with each of the unit numbers selected in step (i) with at least one database index comprises comparing the data units associated with each of the unit numbers selected in step (i) and at least one wild card with at least one database index.

11. The method of claim 10, wherein each wildcard is selected from the group of wildcards comprising representations of prefixes, elements, sub-textual units, any combination thereof and any other suitable representations.

12. The method of claim 1, wherein each element is selected from the group of elements comprising a name, word, character, symbol, and any other suitable element.

* * * * *